United States Patent [19]

Nomura et al.

[11] 4,417,128
[45] Nov. 22, 1983

[54] ARC WELDING METHOD UTILIZING RECIPROCAL MOVEMENT OF A TORCH IN WIDTH DIRECTION OF GROOVE TO BE WELDED, AND CONTINUOUS MOVEMENT OF TORCH IN LONGITUDINAL DIRECTION OF GROOVE TO BE WELDED

[75] Inventors: Hirokazu Nomura; Yuji Sugitani, both of Tsu; Yasuo Suzuki, Hisai, all of Japan

[73] Assignee: Nippon Kokan Kabushiki Kaisha, Tokyo, Japan

[21] Appl. No.: 345,231

[22] Filed: Feb. 3, 1982

[51] Int. Cl.$^3$ .............................................. B23K 9/12
[52] U.S. Cl. ........................... 219/125.12; 219/124.34
[58] Field of Search ...................... 219/125.12, 124.34, 219/137 PS

[56] References Cited

U.S. PATENT DOCUMENTS

| | | |
|---|---|---|
| 4,151,395 | 4/1979 | Kushner et al. |
| 4,158,124 | 6/1979 | Connell ..................... 219/125.12 |
| 4,192,986 | 3/1980 | Udagawa et al. .............. 219/124.34 |

FOREIGN PATENT DOCUMENTS

| | | |
|---|---|---|
| 2737055 | 8/1977 | Fed. Rep. of Germany . |
| 3150813 | 8/1982 | Fed. Rep. of Germany . |
| 2478508 | 9/1981 | France . |
| 54-19445 | 2/1979 | Japan .............................. 219/125.12 |
| WO82/01839 | 6/1982 | PCT Int'l Appl. . |
| 2027236 | 2/1980 | United Kingdom . |
| 2090434 | 7/1982 | United Kingdom . |

Primary Examiner—C. C. Shaw
Attorney, Agent, or Firm—Frishauf, Holtz, Goodman & Woodward

[57] ABSTRACT

An arc-welding method comprises reciprocally moving a welding electrode substantially vertically toward a groove formed between objects of welding, in the width direction of the groove, following the face of the groove; producing, by a welding torch, an arc between the tip of the electrode and the groove; moving the torch vertically up and down so that one of an arc voltage and arc current of the arc agrees with a previously set value; continuously detecting the vertical position of the torch as a value of voltage indicated by a potentiometer; and reversing the direction of the movement of the torch in the width direction of the groove at the moment when the detected value of voltage agrees with a previously set value of voltage. The method further comprises calculating, for one movement of the torch in the width direction of the groove, the value of the difference between the previously set value of voltage and the value of voltage detected by the potentiometer when the torch is at the lowest position thereof; and reversing the direction of movement of the torch in the width direction of the groove at the moment when the continuously detected value of voltage of the torch agrees with the calculated value of difference.

3 Claims, 6 Drawing Figures

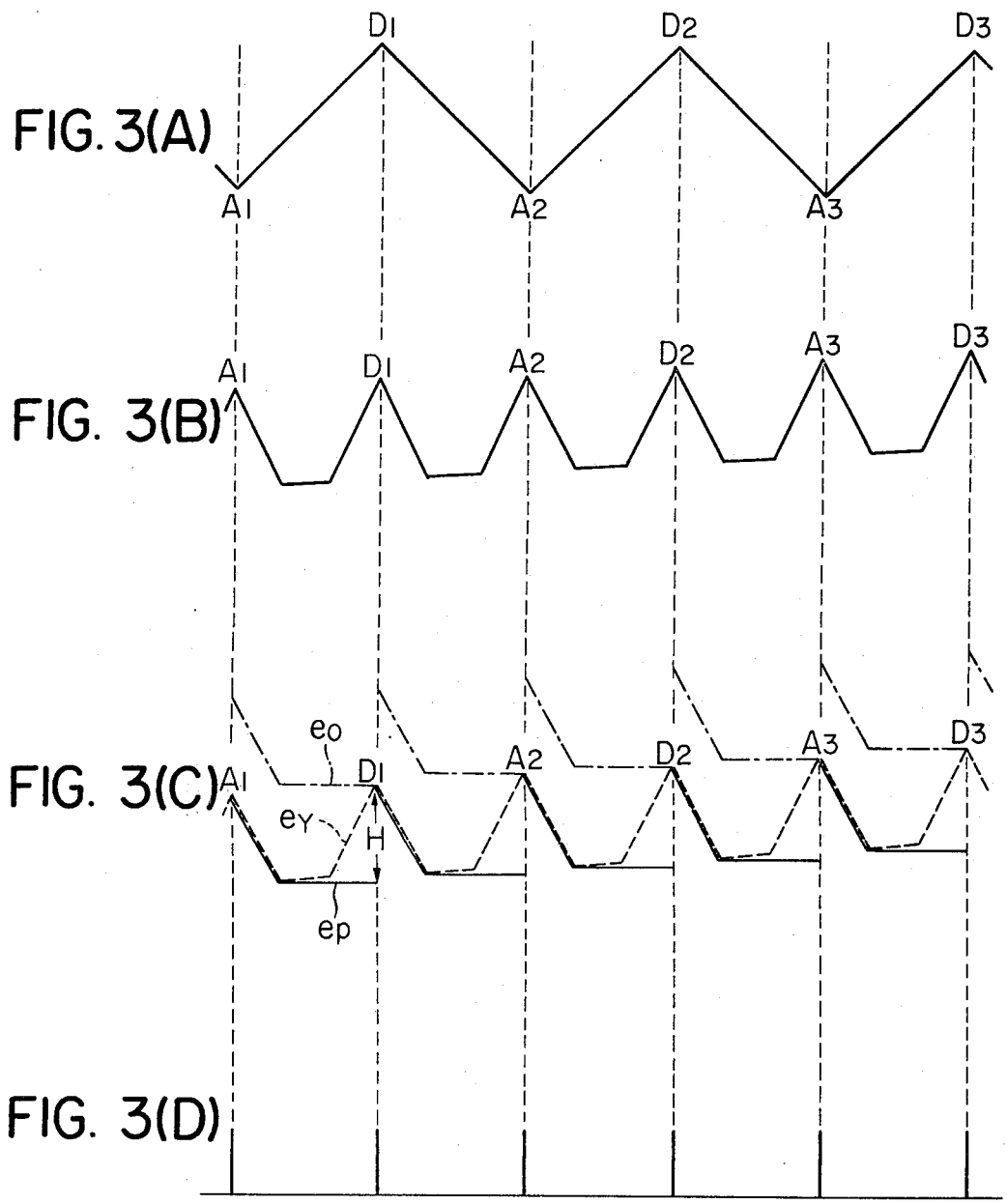

ARC WELDING METHOD UTILIZING RECIPROCAL MOVEMENT OF A TORCH IN WIDTH DIRECTION OF GROOVE TO BE WELDED, AND CONTINUOUS MOVEMENT OF TORCH IN LONGITUDINAL DIRECTION OF GROOVE TO BE WELDED

FIELD OF THE INVENTION

The present invention relates to an arc-welding method which comprises reciprocally moving a welding torch, following the face of a groove formed between objects of welding, in the width direction of said groove, and, at the same time, continuously moving said torch in the longitudinal direction of said groove to automatically weld said objects of welding together in the longitudinal direction of said groove.

BACKGROUND OF THE INVENTION

An arc-welding method is known, which comprises, when welding objects of welding together in the longitudinal direction of a groove formed between the objects of welding by the arc-welding method using a consumable or non-consumable welding electrode, reciprocally moving a welding torch, following the face of the groove, in the width direction of said groove, and, at the same time, continuously moving said torch in the longitudinal direction of said groove, to automatically weld the objects of welding together in the longitudinal direction of the groove.

In order to weld the objects of welding together by the above-mentioned method, it is necessary to reciprocally move the welding torch, following the face of the groove, in the width direction of and in the vertical direction toward the groove, and reverse the direction of movement of the welding torch at a prescribed position relative to the groove while maintaining the distance between the tip of the welding electrode and the groove at a prescribed distance. In order to cause the welding torch to follow the face of the groove, it is necessary to detect the position of the tip of the welding electrode relative to the groove.

For the purpose of detecting the position of the tip of the welding electrode relative to the groove, the conventional practice has been to employ a contact type detecting sensor which detects the position of the welding electrode relative to the groove, by providing a roller as a follower near the welding electrode and causing this roller to be in contact with the face of the groove, with the use of a differential transformer, a potentiometer or a limit switch, or to employ a non-contact type detecting sensor which detects the welding electrode relative to the groove, by an electromagnetic or optical position detector provided near the welding electrode, with the use of magnetism or light.

In any of the above-mentioned conventional detecting methods, there is a certain distance between the detecting position by the above-mentioned sensor and the position of the welding electrode, since the position of the welding electrode is detected by the sensor provided at a certain distance apart from the welding electrode. When controlling the position of the welding electrode, therefore, it was necessary to set a time-lag depending upon the aforementioned distance to correct the result detected by the sensor, and this has led to a complicated control device and to the problem of the impossibility of achieving a high accuracy in controlling.

As a welding method to solve these problems, therefore, we proposed an arc-welding method as disclosed in Japanese Patent Provisional Publication No. 19,445/79 dated Feb. 14, 1979 (hereinafter referred to as the "prior art"). The prior art is a method which comprises, without separately providing a sensor for detecting the position of the welding electrode, detecting the position of the welding electrode by means of the arc itself produced between the tip of the welding electrode and the groove, and causing the tip of the welding electrode to follow the face of the groove by controlling the position of the welding electrode on the basis of the result of detection, as summarized as follows:

The method of the prior art comprises: directing a welding torch substantially vertically toward a groove formed between objects of welding; directing a welding electrode through said torch toward said groove; feeding a welding current to said electrode to produce an arc between the tip of said electrode and said groove to weld the objects of welding together by means of the arc heat; moving said torch in the width direction of the groove; continuously detecting one of arc voltage and arc current of said arc; calculating the deviation of the thus detected value from the value of one of previously set arc voltage and arc current; moving the torch vertically up and down so that the deviation becomes null, thereby maintaining the distance between the tip of the electrode and the groove at a prescribed distance during the movement of said torch in the width direction of said groove; continuously detecting the vertical position of the torch as a value of voltage indicated by a potentiometer for each movement of said torch in the width direction of the groove; reversing the direction of the movement of said torch in the width direction of the groove at the moment when the value of voltage thus detected agrees with the previously set value of voltage; repeating the movement of the torch in the width direction of the groove, the movement of the torch in the vertical direction, and the reversal of the direction of the movement of the torch in the width direction of the groove; on the other hand, continuously moving the torch in the longitudinal direction of the groove; thereby reciprocally moving the torch in the width direction of the groove following the face of the groove while maintaining the distance between the tip of the electrode and the groove at said prescribed distance, and, at the same time, moving the torch in the longitudinal direction of the groove so as to weld the objects of welding in the longitudinal direction of the groove.

According to the prior art presented above, since it is possible to detect the position of the welding electrode by the arc itself and carry out welding by causing the welding electrode to follow the groove face on the basis of the result of this detection, it is not necessary to separately provide a sensor for detecting the position of the welding electrode, and it is possible to control the position of the welding electrode at a high accuracy.

However, the above-mentioned prior art was found to involve the following problems. Upward or downward inclinations or wavy deformations are often existent on the bottom face of the groove formed between the objects of welding. According to the above-mentioned prior art, since the reversal of the reciprocating torch in the width direction of the groove is conducted at the moment when the detected value of voltage indicating the position of the torch, i.e, the height of the torch agrees with a prescribed value of voltage representing the reversing position of the torch, i.e., the reversing height of the torch determined on the basis of a height of rails on which a carriage of the torch travels, the torch would be reversed always at the above-mentioned reversing height of the torch, irrespective of the presence of the upward or downward inclinations or the wavy deformations appearing on the bottom face of the groove, i.e., not at a certain height from the bottom face of the groove. As a result, the height of the formed bead from the bottom face of the groove becomes non-uniform, thus resulting in a defective penetration and production of welding defects, and leading to the impossibility of reversing the torch when the bottom face of the groove inclines upward.

SUMMARY OF THE INVENTION

An object of the present invention is therefore to provide an arc-welding method which, when reciprocally moving a welding electrode directed substantially vertically through a welding torch toward a groove formed between objects of welding, following the face of said groove, in the width direction of the groove, and, at the same time, moving said torch in the longitudinal direction of said groove to automatically arc-weld said objects of welding together in the longitudinal direction of said groove, permits automatic reversal of the direction of movement of the reciprocating torch in the width direction of the groove at a certain height from the bottom face of the groove even if the bottom face of the groove is formed by the upward or downward inclinations or the wavy deformations, thereby allowing formation of a bead always at a constant height from the bottom face of the groove.

In accordance with one of the features of the present invention, there is provided, in an arc-welding method which comprises:

directing a welding torch substantially vertically toward a groove formed between objects of welding; directing a welding electrode through said torch toward said groove; feeding a welding current to said electrode to produce an arc between the tip of said electrode and said groove to weld said objects of welding together by means of the arc heat; moving said torch in the width direction of said groove; continuously detecting one of arc voltage and arc current of said arc; calculating the deviation of the thus detected value from a value of one of previously set arc voltage and arc current; moving said torch vertically up and down so that said deviation becomes null, thereby maintaining the distance between the tip of said electrode and said groove at a prescribed distance during the movement of said torch in the width direction of said groove; continuously detecting the vertical position of said torch as a value of voltage indicated by a potentiometer for each movement of said torch in the width direction of said groove; reversing the direction of the movement of said torch in the width direction of said groove at the moment when said value of voltage thus detected agrees with a previously set value of voltage; repeating the movement of said torch in the width direction of said groove, the movement of said torch in the vertical direction, and the reversal of the direction of the movement of said torch in the width direction of said groove; continuously moving said torch in the longitudinal direction of said groove; thereby reciprocally moving said torch in the width direction of said groove following the face of said groove while maintaining the distance between the tip of said electrode and said groove at said prescribed distance, and, at the same time, moving said torch in the longitudinal direction of said groove so as to weld said objects of welding together in the longitudinal direction of said groove;

the improvement characterized by:

calculating, for one movement of said torch in the width direction of said groove, the value of a difference between said previously set value of voltage for the purpose of reversing the direction of movement of said torch in the width direction of said groove and the value of voltage detected by said potentiometer when said torch is at the lowest position thereof; and, reversing the direction of movement of said torch in the width direction of said groove at the moment when said continuously detected value of voltage of said torch agrees with said calculated value of difference.

BRIEF DESCRIPTION OF THE DRAWINGS

FIG. 3 (A) is a descriptive view illustrating continuously the movement of the welding electrode by means of the locus on a plane;

FIG. 3 (B) is a descriptive view illustrating continuously the movement of the welding electrode by means of the locus along the groove face;

FIG. 3 (C) is a wave-form diagram of values of voltage $e_Y$, $e_P$ and $e_O$ shown in the block diagram of FIG. 2; and, FIG. 3 (D) is a wave-form diagram illustrating pulse signals fed by the horizontal driving motor controller shown in the block diagram of FIG. 2.

DETAILED DESCRIPTION OF THE PREFERRED EMBODIMENTS

With a view to solving the above-mentioned problems in the arc-welding of the objects of welding, we carried out extensive studies.

As a result, we found that it is possible to form a bead always at a uniform height from the bottom face of the groove even if the bottom face of the groove is deformed by continuously detecting, as a value of voltage, the height, i.e., the vertical position of the welding torch reciprocating in the width direction of the groove following the face of the groove, and reversing the direction of the movement of the torch in the width direction of the groove at the moment when said detected value of voltage agrees with said value of voltage calculated on the basis of a previously set height from the bottom face of the groove and representing the reversing position of the torch, i.e., the reversing height of the torch from the bottom face of the groove.

The present invention was made on the basis of the above-mentioned finding.

Figure 1:
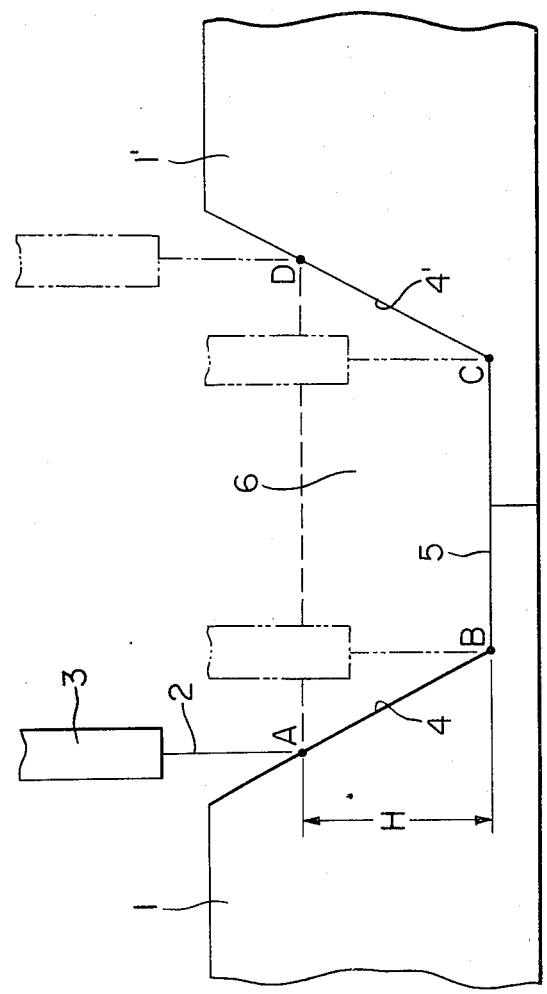
FIG. 1 is a descriptive view illustrating the principle of the present invention.

Now, the arc-welding method of the present invention is described with reference to the drawings. FIG. 1 is a descriptive view illustrating the principle of the present invention. In FIG. 1, 1 and 1' are objects of welding; 6 is a U-shaped groove, which comprises inclined opposite faces 4 and 4' opening upward and a bottom face 5, formed between the objects of welding 1 and 1'; 2 is a welding electrode inserted substantially vertically into the groove 6; 3 is a welding torch for inserting the welding electrode 2, said welding electrode 2 may be a consumable electrode, i.e., a wire fed at a constant rate or may be a non-consumable electrode. An arc is produced between the tip of the welding electrode 2 and the groove 6 to weld the objects of welding 1 and 1' together by means of the arc heat. The welding position of the groove 6 is shielded from the open air by a shielding gas ejected from the tip of the torch 3 or ejected from a nozzle (not shown) separately provided.

The torch 3 goes down, as shown by the two-point chain line in FIG. 1, from point A on the inclined face 4 on one side along the inclined face 4 to point B on the bottom face 5, then moves along the bottom face 5 to point C, and then rises along the inclined face 4' on the other side to point D. In this movement, the torch 3 is vertically moved up and down so as to maintain the arc voltage or the arc current of the arc produced between the tip of the welding electrode 2 and the groove 6 always at a constant value, thereby maintaining the distance between the tip of the welding electrode 2 and the groove 6 at a prescribed distance. The vertical position of the torch 3 moving vertically up and down relative to the groove 6 is continuously detected as a value of voltage for each movement of the torch in the width direction of the groove 6. At the moment when the torch rises by a prescribed distance H from the bottom face 5 of the groove 6, as indicated by the above-mentioned detected value of voltage, that is, when the detected value of voltage agrees with the value of voltage representing the vertical position of the torch 3 at point D in FIG. 1, the direction of movement of the torch 3 in the width direction of the groove 6 is reversed.

Figure 2:
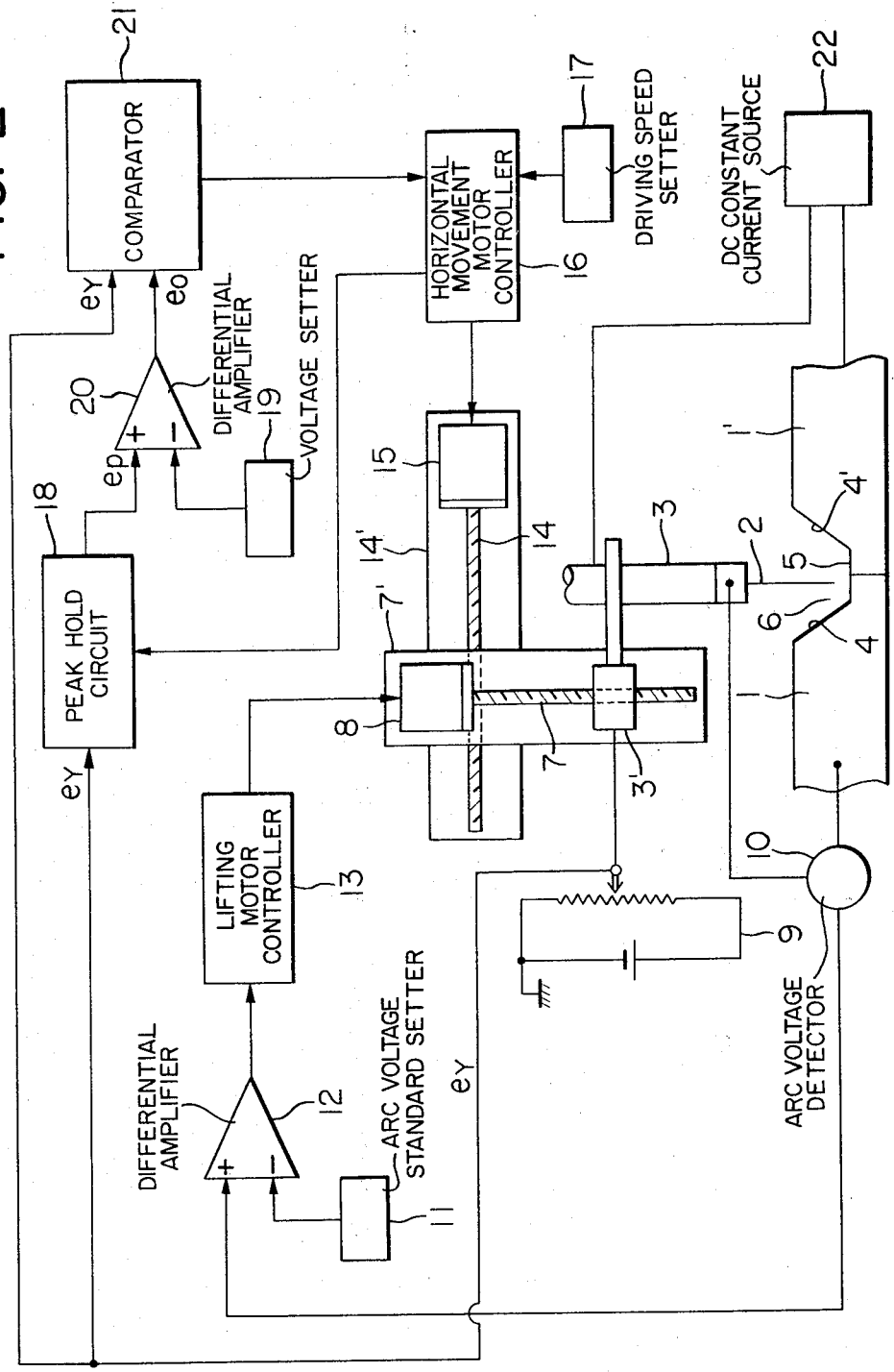
FIG. 2 is a block diagram illustrating an embodiment of the present invention.

FIG. 2 is a block diagram illustrating an embodiment of the present invention, which represents a case in which the torch 3 is vertically moved up and down so as to maintain the arc voltage of the arc produced between the tip of the welding electrode 2 and the groove 6 always at a constant value. In FIG. 2, the torch 3 having therethrough the welding electrode 2 inserted substantially vertically into the groove 6 formed between the objects of welding 1 and 1' is moved in the longitudinal direction of the groove 6 by the carriage travelling on rails (not shown) installed on one of the objects of welding 1 and 1' in parallel with the longitudinal direction of the groove 6.

In FIG. 2, 7 is a vertical screw stock for moving the torch 3 vertically up and down; 7' is a fitting of the vertical screw stock 7; 8 is a lifting motor, provided on the top of the fitting 7', for rotating the vertical screw stock 7 to move the torch 3 vertically up and down; and a support member 3' for supporting the torch 3 threadably engages with the vertical screw stock 7. Also in this figure, 14 is a horizontal screw stock for horizontally moving the torch 3; 14' is a fitting of the horizontal screw stock 14; 15 is a horizontal movement motor, provided at one end of the fitting 14', for rotating the horizontal screw stock 14 to horizontally move the torch 3; and the fitting 7', to which the vertical screw stock 7 is fitted, engages threadably with the horizontal screw stock 14. Therefore, the torch 3 is moved vertically up and down while moved in the width direction of the groove 6 by the drives of the lifting motor 8 and the horizontal movement motor 15.

Also in FIG. 2, 10 is an arc voltage detector connected between the torch 3 and one of the objects of welding 1; 11 is an arc voltage standard setter; 12 is a differential amplifier for calculating the deviation of the value of an voltage detected by the arc voltage detector 10 from a value of arc voltage previously set by the arc voltage standard setter 11 and for amplifying this deviation to a certain level to issue a deviation signal; and 13 is a lifting motor controller which controls driving of the lifting motor 8 and reversal of the driving direction thereof on the basis of the deviation signal issued from the differential amplifier 12. The value of arc voltage detected by the arc voltage detector 10 is compared by the differential amplifier 12 with the value of arc voltage previously set by the arc voltage standard setter 11. The differential amplifier 12 feeds to the lifting motor controller 13 the deviation signal of the detected value of arc voltage from the set value of arc voltage, and thereby the lifting motor controller 13 drives the lifting motor 8 so as to bring the deviation signal to null. Thus, the torch 3 moving in the width direction of the groove 6 is controlled so that the distance between the tip of the welding electrode 2 and the groove 6 is maintained always at a prescribed distance.

In the same figure, 9 is a potentiometer indicating the vertical position of the torch 3 moving vertically up and down relative to the groove 6 as a value of voltage; 16 is a horizontal movement motor controller having mechanism for controlling the driving and reversal of the driving direction of the horizontal movement motor 15 and for producing a pulse at the time of reversing the driving direction; 17 is a driving speed setter for ensuring driving of the horizontal movement motor 15 at a constant speed; and, 18 is a peak hold circuit for receiving the output values of voltage issued from the potentiometer 9 and holding the peak value of voltage thereof.

Further, 19 is a setter storing a previously set value of voltage, corresponding to a previously set height from the bottom face 5 of the groove 6 for reversing the direction of movement of the torch 3 in the width direction of the groove 6; 20 is a differential amplifier which calculates the value of difference between the peak value of voltage held in the peak hold circuit 18 and said value of voltage stored in the setter 19, and putting out this value of difference after amplifying it to a certain level; 21 is a comparator which issues a movement reversing signal of the torch 3 in the width direction of the groove 6 to the horizontal movement motor controller 16 at the moment when the value of voltage continuously put out from the potentiometer 9 agrees with the value of voltage calculated by said differential amplifier 20; and, 22 is a DC constant-current source for welding connected between the object of welding 1' and the torch 3.

For each movement of the torch 3 in the width direction of the groove 6, the vertical position of the torch 3 is continuously detected by the potentiometer 9 as a value of voltage $e_Y$, and the potentiometer 9 sends this detected value of voltage $e_Y$ to the peak hold circuit 18 and the comparator 21. The potentiometer 9 is arranged so that a higher value of voltage is produced according as the torch 3 goes down toward the bottom face 5 of the groove 6. By this arrangement, the potentiometer 9 continuously sends the value of voltage $e_Y$, which becomes higher according as the torch 3 goes down along the inclined face 4 on one side toward the bottom face 5 in the groove 6 and becomes lower according as the torch 3 goes up from the bottom face 5 along the inclined face 4' on the other side in the groove 6, to the peak hold circuit 18 and the comparator 21.

The peak hold circuit 18 holds, for each movement of the torch 3 in the width direction of the groove 6, the peak value of voltage from among values of voltage $e_Y$ received from the potentiometer 9 in said one movement, i.e., the value of voltage $e_P$ when the torch 3 is at the lowest position thereof, and sends this value of voltage $e_P$ to the differential amplifier 20. The differential amplifier 20 calculates the value of difference in voltage between a previously set value of voltage stored in the setter 19 and the value of voltage $e_P$ held in the peak hold circuit 18 when the torch 3 is at the lowest position thereof, i.e., the value of voltage $e_O$ indicating the reversing position of the direction of movement of the torch 3, and sends this value of voltage $e_O$ to the comparator 21.

The comparator 21 compares, for each movement of said torch 3, the value of voltage $e_Y$ indicating the vertical position of the torch 3 detected continuously by the potentiometer 9 with the value of voltage $e_O$ indicating the reversing position of the direction of movement of said torch 3 to issue a movement reversing signal of the torch 3 to the horizontal movement motor controller 16 when said value of voltage $e_Y$ agrees with said value of voltage $e_O$. The horizontal movement motor controller 16 reverses the rotation of the horizontal movement motor 15 by means of said movement reversing signal. As a result, the rotation of the horizontal screw stock 14 is reversed, thus resulting in the reversal of the direction of movement of the torch 3 in the width direction of the groove 6 through the fitting 7' engaging threadably with the horizontal screw stock 14.

At the same time as said reversal of the direction of movement of the torch 3, the horizontal movement motor controller 16 issues a pulse signal to the peak hold circuit 18. The peak hold circuit 18 clears the holding of the value of voltage $e_P$ for that movement in response to said pulse signal. Then, along with the reversal of the direction of movement of the torch 3, the peak hold circuit 18 repeats the above-mentioned operations, upon receipt of a new value of voltage $e_Y$ representing the vertical position of the torch 3 sent from the potentiometer 9. Thus, the direction of movement of the torch 3 in the width direction of the groove 6 is reversed at a certain height from the bottom face 5 of the groove 6.

The above-mentioned movement of the torch 3 in the width direction of the groove and vertically thereto, and the reversal of the direction of movement of the torch 3 in the width direction of the groove 6 are repeated, thereby reciprocally moving the tip of the welding electrode 2 in the width direction of the groove 6, following the face of the groove 6, while maintaining the distance between the tip of the welding electrode 2 and the groove 6 always at a prescribed distance, and at the same time, moving said torch in the longitudinal direction of the groove thus to weld the objects of welding 1 and 1' together in the longitudinal direction of the groove 6. Multi-layer welding is thus applied in the groove 6 by repeating the steps as mentioned above, and welding of the objects of welding 1 and 1' is completed.

Now, the present invention is described with reference to FIGS. 3 (A) to 3 (D) as to an embodiment in the case where the bottom face of the groove 6 formed between the objects of welding 1 and 1' has an upward inclination of the travelling direction of the torch 3 and the rails for the carriage for moving the torch 3 installed on the object of welding 1 and 1' is not parallel to the bottom face of said groove 6 in the travelling direction of the torch 3. FIG. 3 (A) is a descriptive view illustrating continuously the movement of the welding electrode 2 by means of the locus on the plane; FIG. 3 (B) is a descriptive view illustrating continuously the movement of the welding electrode 2 by means of the locus along the groove face; FIG. 3 (C) is a wave-form diagram of values of voltage $e_Y$, $e_P$ and $e_O$ shown in the block diagram of FIG. 2, said values of voltage $e_Y$, $e_P$ and $e_O$ are indicated along the longitudinal axis of the wave-form diagram so as to increase in the down ward direction of the axis; and, FIG. 3 (D) is a wave-form diagram illustrating pulse signals fed by the horizontal movement motor controller 16 shown in the block diagram of FIG. 2.

In FIGS. 3 (A) and (B), when the direction of movement of the torch 3 is reversed at point $A_1$ on the inclined face on one side of the groove 6, a pulse signal shown in FIG. 3 (D) for clearing the holding of the value of voltage $e_P$ from the preceding cycle and starting storage of the position of the torch 3 at point $A_1$ is entered from the horizontal movement motor controller 16 into the peak hold circuit 18. The torch 3 travels from point $A_1$ on the inclined face on one side toward point $D_1$ on the other side in the groove 6 while moving up and down along the face of the groove 6 as shown in FIG. 3 (B).

The vertical positions of the torch 3 moving in the groove 6 are issued from the potentiometer 9 as the values of voltage $e_Y$ which become higher according as the torch 3 goes from point $A_1$ down toward the bottom face of the groove 6, as shown by the dotted line in FIG. 3 (C). The peak value of voltage of said values of voltage $e_Y$, i.e., the value of voltage $e_P$ when the tip of the welding electrode 2 is at the lowest position in the groove 6 is held by the peak hold circuit 18, as shown by the solid line in FIG. 3 (C).

In FIG. 3 (C), H is the value of voltage corresponding to the height from the bottom face 5 of the groove 6, stored in the setter 19, for reversing the direction of movement of the torch 3 in the width direction of the groove 6, and $e_O$ represented by the one-point chain line is the value of difference in voltage between said value of voltage H and the value of voltage $e_P$ when the torch 3 is at the lowest position thereof, i.e., the value of voltage indicating the reversing position of the torch 3, for each movement of the torch 3 in the width direction of the groove 6.

The value of voltages $e_Y$ indicated by the potentiometer 9 become lower according as the torch 3 goes from the bottom face up toward point $D_1$ on the inclined face on the other side in the groove 6, and at point $D_1$ where said value of voltage $e_Y$ agrees with the value of voltage $e_O$ indicating the reversing position of said torch 3, the direction of movement of the torch 3 in the width direction of the groove 6 is reversed. By the repetition of the above-mentioned steps, the torch 3 moves in the longitudinal direction of the groove 6 while reversing the direction of movement in the width direction of the groove at a certain height from the lowest position in the groove 6. Therefore, a bead with a uniform height is formed in the groove 6, and thus the objects of welding 1 and 1' are satisfactorily welded together.

In the above-mentioned example, when determining the value of voltage $e_O$ indicating the reversing position of the torch 3, the value of difference between the previously set value of voltage and the value of voltage indicated by the potentiometer 9 when said torch is at the lowest position thereof has been calculated on the basis of the value of voltage indicated by the potentiometer 9 when the torch 3 is at the lowest position thereof in each movement of the torch 3 in the width direction of the groove 6, for said one movement. This calculation may be made on the basis of the value of voltage indicated by the potentiometer 9 when the torch 3 has been at the lowest position thereof in one of the two movements preceding said one movement. In this case, a memory circuit is provided in the peak hold circuit 18, and the value of voltage $e_p$ when the tip of the welding electrode 2 has been at the lowest position in the groove 6 in one of the movements preceding said one movement is stored in this memory circuit. Said value of voltage $e_p$ thus stored is issued to the differential amplifier 20 in response to the pulse signal issued at the time of reversal of the direction of movement of the torch 3.

Also in the above-mentioned example, the distance between the tip of the welding electrode 2 and the groove 6 has been maintained at a certain distance by detecting the arc voltage with the use of a constant-current electric power source and controlling the vertical position of the torch 3 so as to keep this arc voltage always at a prescribed value. This may also be accomplished by detecting the arc current with the use of a constant-voltage electric power source in place of the arc voltage, and controlling the vertical position of the torch 3 so as to keep this arc current always at a prescribed value.

According to the arc-welding method of the present invention, as described above, when reciprocally moving a welding electrode directed substantially vertically toward a groove formed between objects of welding through a welding torch, following the face of said groove, in the width direction of the groove, and, at the same time, moving said torch in the longitudinal direction of said groove to automatically arc-weld the objects of welding together in the longitudinal direction of said groove, it is possible to reverse the direction of movement of the reciprocating torch in the width direction of the groove, automatically at a certain height from the bottom face of the groove, even in the presence of the upward or downward inclinations or the wavy deformations on the bottom face of the groove. It is therefore possible to form a bead always with a constant height from the bottom face of the groove therein, resulting in a satisfactory penetration and hence an excellent weld, thus providing industrially useful effects.

What is claimed is:
1. In an arc-welding method, which comprises:
directing a welding torch substantially vertically toward a groove formed between objects of welding; directing a welding electrode through said torch toward said groove; feeding a welding current to said electrode to produce an arc between the tip of said electrode and said groove to weld said objects of welding together by means of the arc heat; moving said torch in the width direction of said groove; continuously detecting one of arc voltage and arc current of said arc; calculating the deviation of the thus detected value from a value of one of previously set arc voltage and arc current; moving said torch vertically up and down so that said deviation becomes null, thereby maintaining the distance between the tip of said electrode and said groove at a prescribed distance during the movement of said torch in the width direction of said groove; continuously detecting the vertical position of said torch as a value of voltage indicated by a potentiometer for each movement of said torch in the width direction of said groove; reversing the direction of the movement of said torch in the width direction of said groove at the moment when said value of voltage thus detected agrees with a previously set value of voltage; repeating the movement of said torch in the width direction of said groove, the movement of said torch in the vertical direction, and the reversal of the direction of the movement of said torch in the width direction of said groove; continuously moving said torch in the longitudinal direction of said groove; thereby reciprocally moving said torch in the width direction of said groove following the face of said groove while maintaining the distance between the tip of said electrode and said groove at said prescribed distance, and, at the same time, moving said torch in the longitudinal direction of said groove so as to weld said objects of welding in the longitudinal direction of said groove;
the improvement characterized by:
calculating, for one movement of said torch in the width direction of said groove, the value of the difference between said previously set value of voltage for the purpose of reversing the direction of movement of said torch in the width direction of said groove and the value of voltage detected by said potentiometer when said torch is at the lowest position thereof; and,
reversing the direction of movement of said torch in the width direction of said groove at the moment when said continuously detected value of voltage of said torch agrees with said calculated value of difference.
2. The method as claimed in claim 1, wherein:
said value of voltage detected by said potentiometer when said torch is at the lowest position thereof is the value of voltage detected in said one movement.
3. The method as claimed in claim 1, wherein:
said value of voltage detected by said potentiometer when said torch is at the lowest position thereof is the value of voltage detected in one of two movements prior to said one movement.

* * * * *